(12) United States Patent
Vandensande

(10) Patent No.: US 7,366,115 B2
(45) Date of Patent: Apr. 29, 2008

(54) MULTIPLEX TRANSMISSION SYSTEM WITH IN-CIRCUIT ADDRESSING

(75) Inventor: Geert Maria Marcel Vandensande, Heverlee (BE)

(73) Assignee: AMI Semiconductor Belgium BVBA, Oudenaarde (BE)

( * ) Notice: Subject to any disclaimer, the term of this patent is extended or adjusted under 35 U.S.C. 154(b) by 994 days.

(21) Appl. No.: 10/319,347

(22) Filed: Dec. 13, 2002

(65) Prior Publication Data
US 2004/0117537 A1    Jun. 17, 2004

(30) Foreign Application Priority Data
Dec. 13, 2001    (EP)    ................................... 01403234
Dec. 17, 2001    (EP)    ................................... 01403275

(51) Int. Cl.
*H04L 12/28*    (2006.01)
(52) U.S. Cl. ........................................ 370/257; 370/442
(58) Field of Classification Search ..................... None
See application file for complete search history.

(56) References Cited
U.S. PATENT DOCUMENTS
5,583,754 A    12/1996    Leonhardt
5,602,827 A *    2/1997    Lindeborg et al. .......... 370/223
6,175,553 B1 *    1/2001    Luk et al. .................... 370/222
6,690,677 B1 *    2/2004    Binder ........................ 370/465

FOREIGN PATENT DOCUMENTS
EP    0854609 A2    7/1998
EP    0854609 A3    7/1998

\* cited by examiner

*Primary Examiner*—Brian Nguyen
(74) *Attorney, Agent, or Firm*—Barnes & Thornburg LLP

(57) ABSTRACT

The present invention is related to a transmission system for sending digital data on a digital bus (1), to which are connected a number of master and slave modules. The system is characterized by the fact that a number of modules may comprise two connectors (20, 21) to said bus, and a switch (22) or switches (52, 53), allowing the interruption of said bus. This design allows an address setting procedure to take place, before starting normal operation. During this initialization, the addresses of the modules are set by consecutively closing the switches, and setting the address. Every time a switch is closed in one module, the following module can receive its address. The invention is related to several embodiments of the system allowing this procedure, and to the method of initializing such a system.

16 Claims, 7 Drawing Sheets

MULTIPLEX TRANSMISSION SYSTEM WITH IN-CIRCUIT ADDRESSING

FIELD OF THE INVENTION

Figure 1:
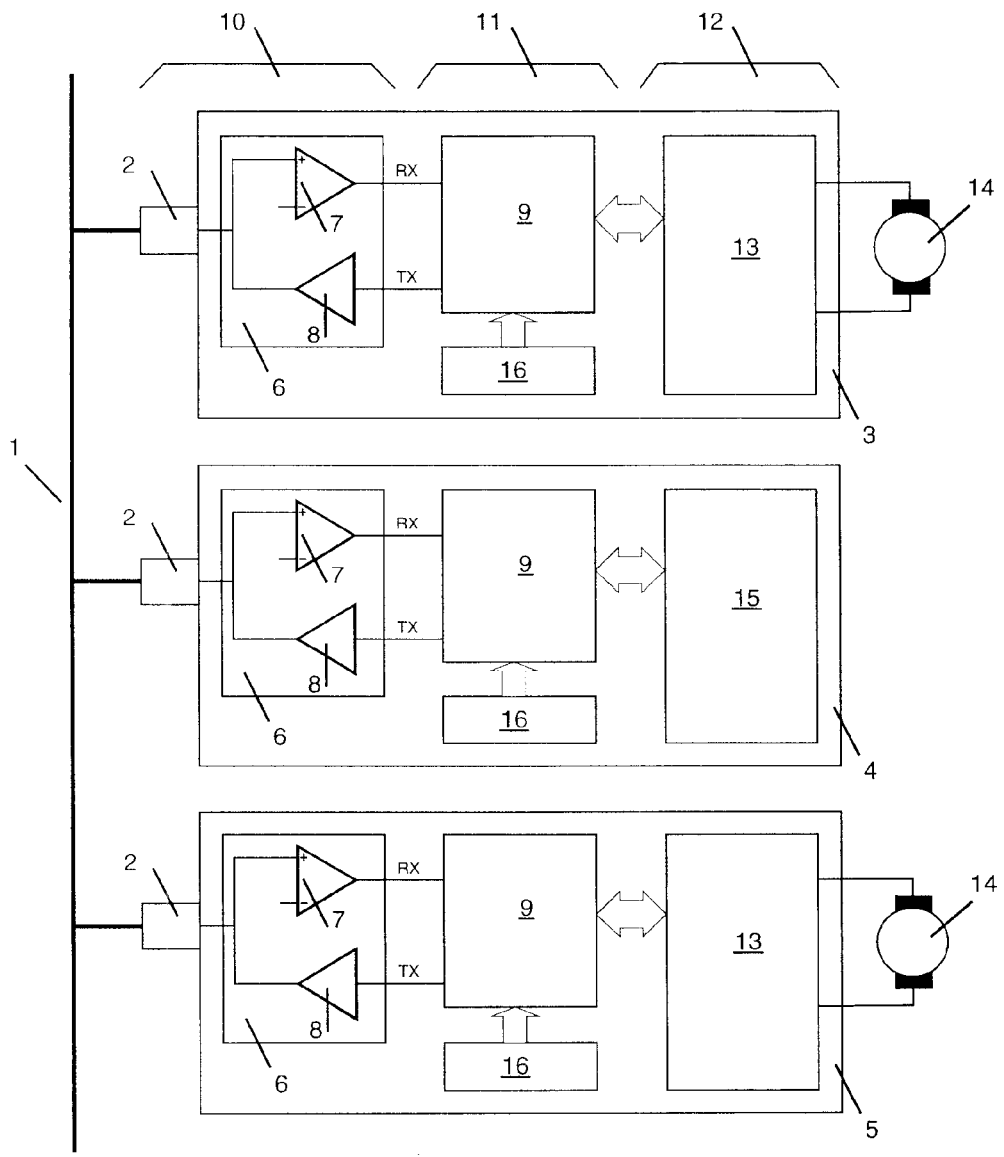

The present invention is related to a transmission system comprising master modules and slave modules, and a bus for transmitting digital data between these modules, in a time division multiplexing mode. The invention is especially suitable for providing an improved transmission system of this kind in automotive applications.

STATE OF THE ART

Time division multiplexing of digital data on a data bus, e.g. a single or double wire, between master and slave modules connected to this bus, is a known way of sending and receiving data, and is used for example in telecommunication applications. Modules connected to a data bus are more generally referred to as 'nodes' in the multiplex transmission system. In-vehicle transmission of electrical signals, in order to control electrical components in the vehicle, is also making use of this technique. In a car, the use of multiplexing between nodes on a single bus allows to avoid the use of dedicated, point-to-point wiring which would result in bulky, complex, and expensive wiring harnesses.

In recent years, the car industry has developed standards for in-vehicle networking. Predominant standards are CAN (Controller Area Network), SAE J1850, LIN (Local interconnect Network) and VAN (Vehicle area network).

A problem which exists in the systems which are known at this point resides in the addressing of modules connected to the data bus. Regardless of the protocol used, a transmission will normally comprise an identifier, followed by the actual data which is sent. The identifier may contain a reference to an action which is to be taken by one or a number of modules, identified by their addresses. Efficient addressing of the modules on the bus is therefore a necessary step in the design and installation of a multiplex system.

In most prior art systems, the address of a module is set manually by using dip-switches, OTP-memory, straps inside the connector, etc. For reasons of stock efficiency, this manual address setting is mostly done at the moment of installing or replacing a given module. This is especially true for identical modules, i.e. of which several are present in the same type of car. The address setting therefore represents a time-consuming operation which is also apt to lead to errors in the setting and consequently in the system's overall performance.

Until recently, this problem was not so relevant because only a very limited number of nodes was used in the car and these nodes were mostly different so that they could receive a different address during production. For future cars the number of nodes and the number of identical nodes amongst them will increase, which calls for a more flexible addressing strategy.

AIMS OF THE INVENTION

The present invention aims to provide a multiplex system and method for initialising said system, which avoids the necessity of manual address setting for the modules in said system.

SUMMARY OF THE INVENTION

The present invention is related to a transmission system for transmitting digital data in a time domain multiplexing mode, comprising a digital data bus, and a plurality of modules coupled to said data bus, characterized in that at least one of said modules of said plurality comprises two connectors, so that data passing through said bus enters said module through one connector and leaves said module through the other connector, and wherein said at least one module further comprises a first switch, placed in the path between said two connectors.

In an embodiment of the transmission system according to the invention, the opening of said first switch interrupts the data transfer via said data bus. Throughout this document, a switch is defined as a device for interrupting the data transfer on a digital data bus. This device may comprise one or more interrupters in every individual wire comprised in said bus.

According to a preferred embodiment, said at least one module further comprises a first transceiver, said first transceiver comprising a comparator and a transmitter.

According to another embodiment, said at least one module further comprises a second transceiver, said second transceiver comprising a comparator and a transmitter, and wherein the input of said comparator and the output of said transmitter of said first transceiver are coupled to one of said two connectors, while the input of said comparator of said second transceiver and the output of said transmitter of said second transceiver are coupled to the other of said two connectors.

According to another embodiment, said at least one module further comprises a second switch, whereby said first switch is placed in the path between the output of the comparator of said first transceiver, and the input of the transmitter of said second transceiver, and whereby said second switch is placed in the path between the output of the comparator of said second transceiver and the input of the transmitter of said first transceiver.

According to the preferred embodiment, said at least one module further comprises a protocol handler and a receiving device adapted to receive a signal sent on said bus, to analyse said signal and to deduce therefrom an address of said at least one module, for subsequent storage into a storage device included in said receiving device, said protocol handler further having the ability to produce command signals for opening or closing said first switch and/or said second switch.

The transmission system of the invention may be an open system, meaning that all modules which are coupled to said bus form a chain of modules which is not closed into a loop. Alternatively, the system may form a closed loop system. In a preferred embodiment of said closed loop system, every module on said closed loop bus system comprises two switches and two transceivers.

The invention is equally related to the individual modules such as described in the preceding paragraphs, and to the use of such a module as a master module in a transmission system for transmitting and receiving digital data in a time domain multiplexing mode, as well as to the use of such a module as a slave module in a transmission system for receiving and transmitting digital data in a time domain multiplexing mode.

The invention is further also related to a method for initializing a transmission system according to the invention, said plurality of modules including at least one master module in charge of address setting of said transmission system, and at least one slave module, said method comprising the steps of:
  providing said transmission system, wherein the connectors of each module of said plurality which is having two connectors, are disconnected from each other within each of said modules which is having two connectors.
  ordering said master module in charge of the address setting, to set the address of a first module which is adjacent to said master module, through a signal sent on the bus connection between said master and said first module,
  ordering said first module to connect its two connectors together,
  ordering the master module to set the address of a second module, adjacent to said first module, through a signal sent on the bus connection between said master and said second module,
  ordering said second module to connect its two connectors together,
  repeating the steps of setting the address and connecting the connectors, until all modules on the system have received their address.

SHORT DESCRIPTION OF THE DRAWINGS

Figure 2:
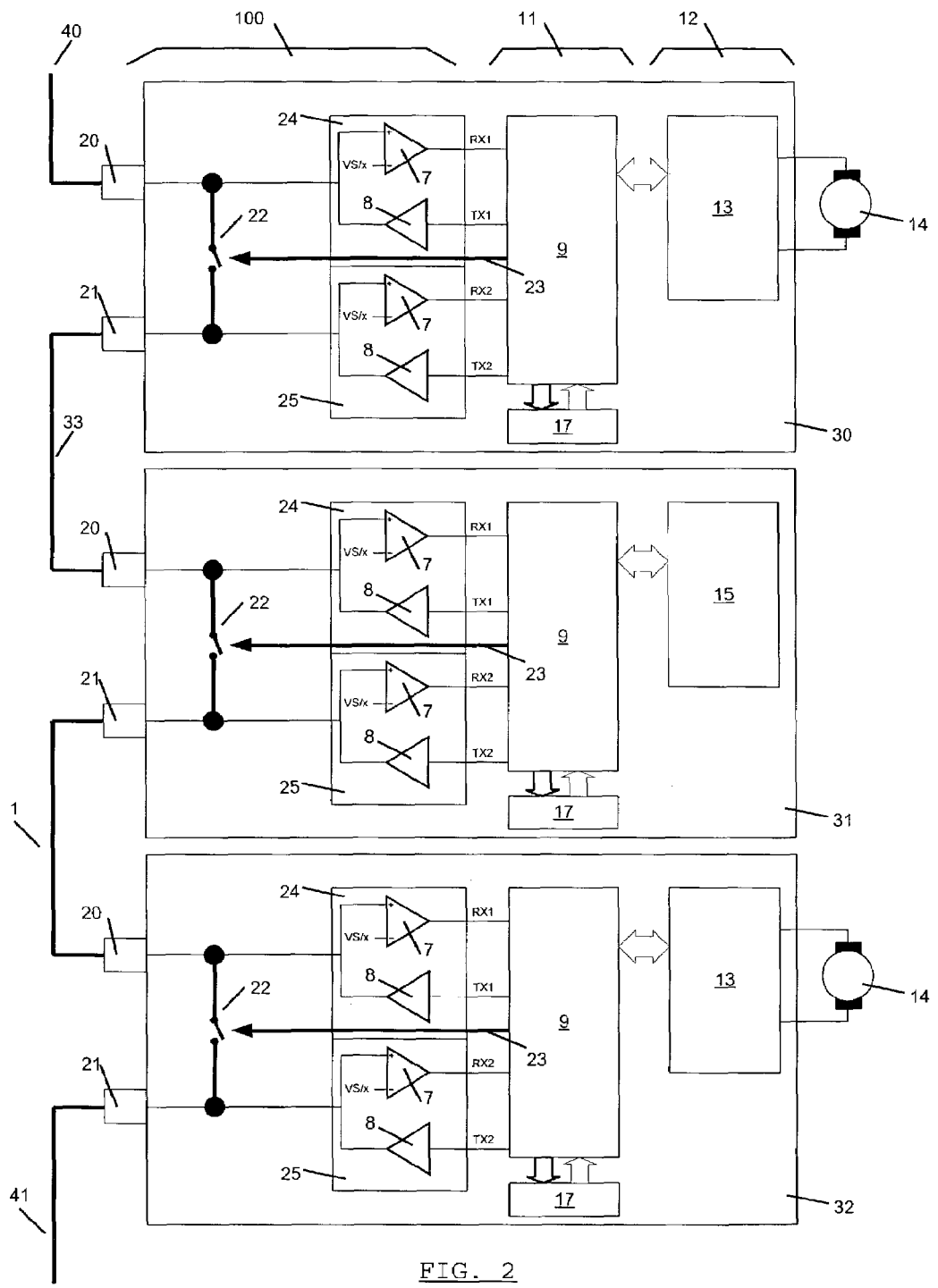
Figure 3:
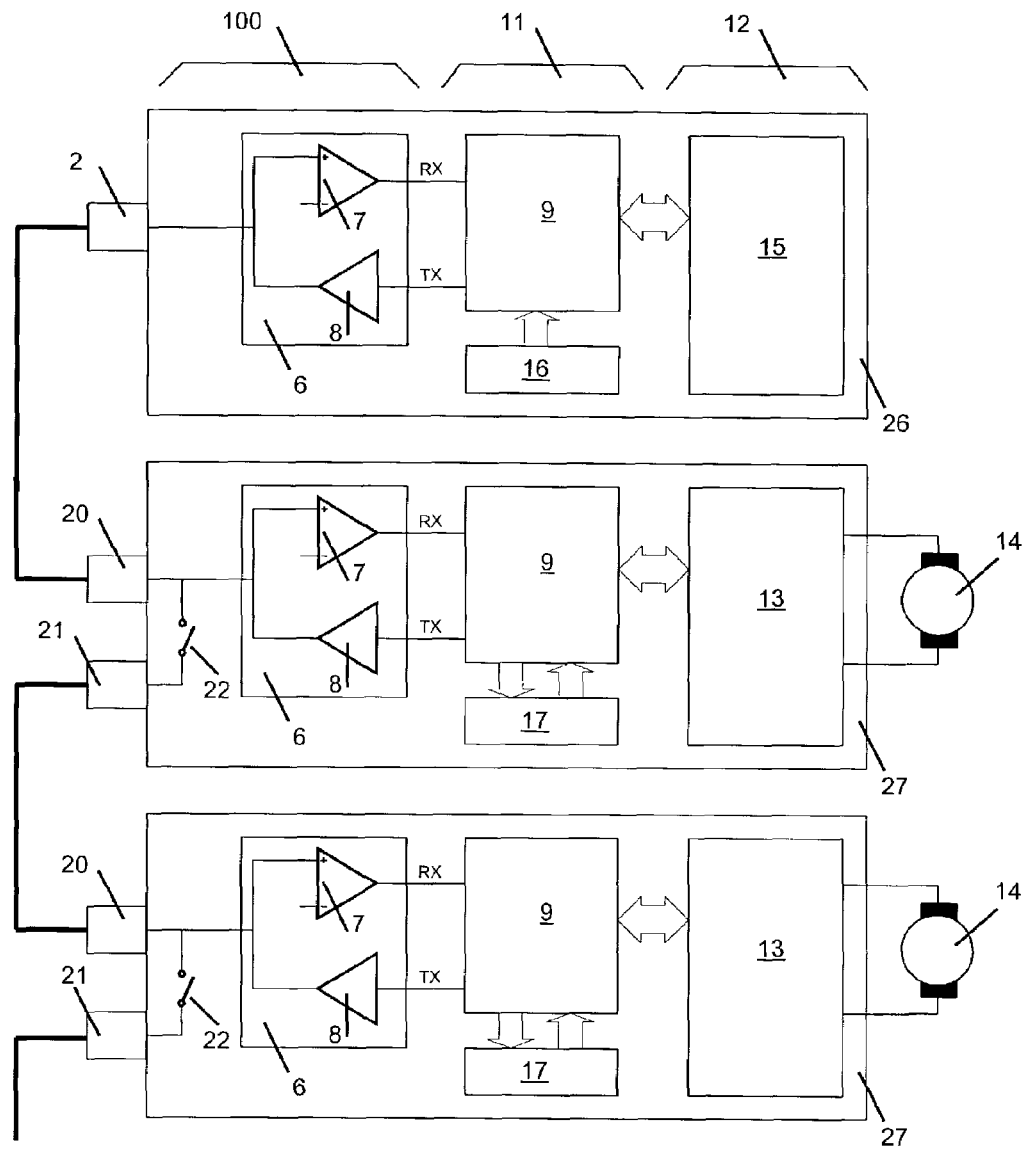
Figure 4:
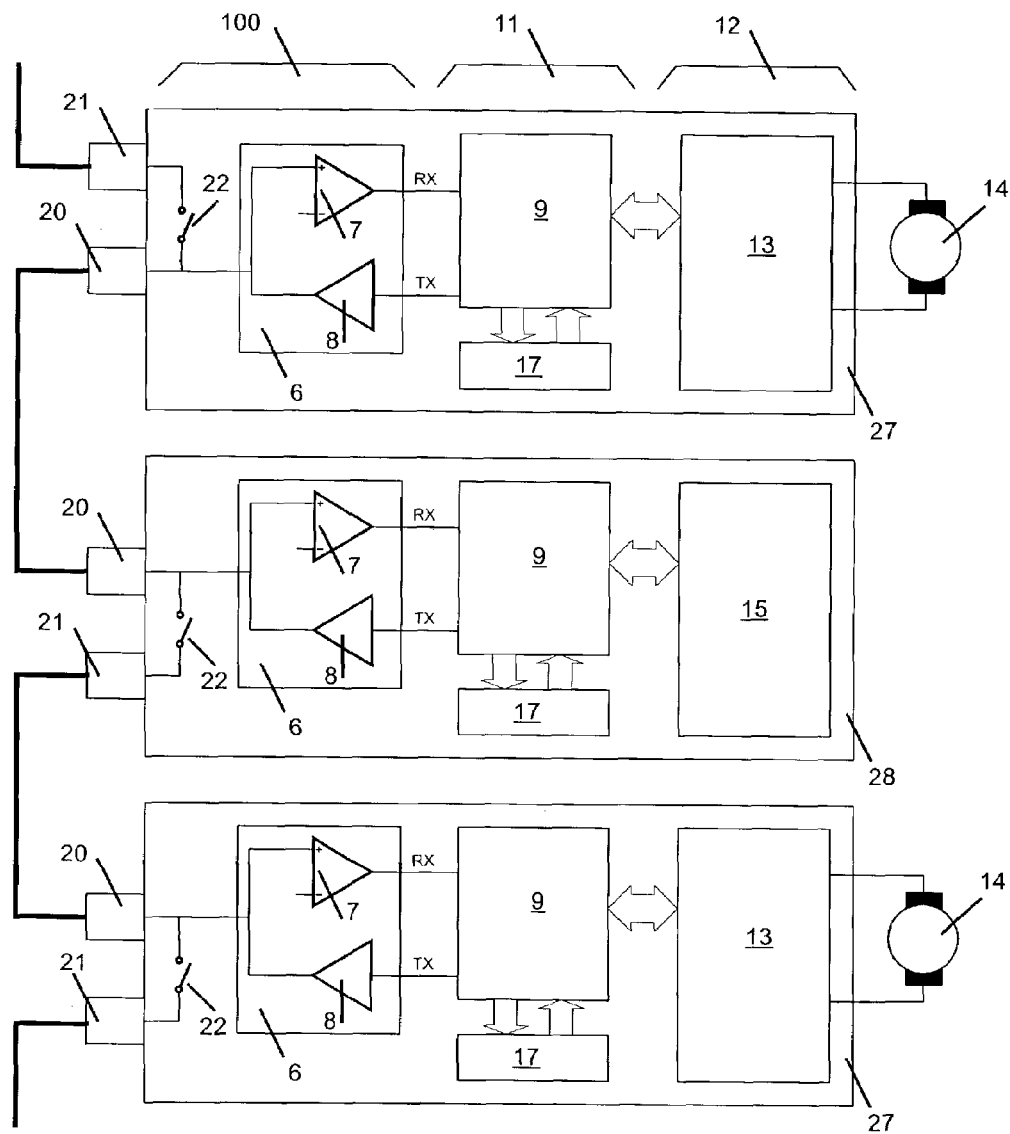
Figure 5:
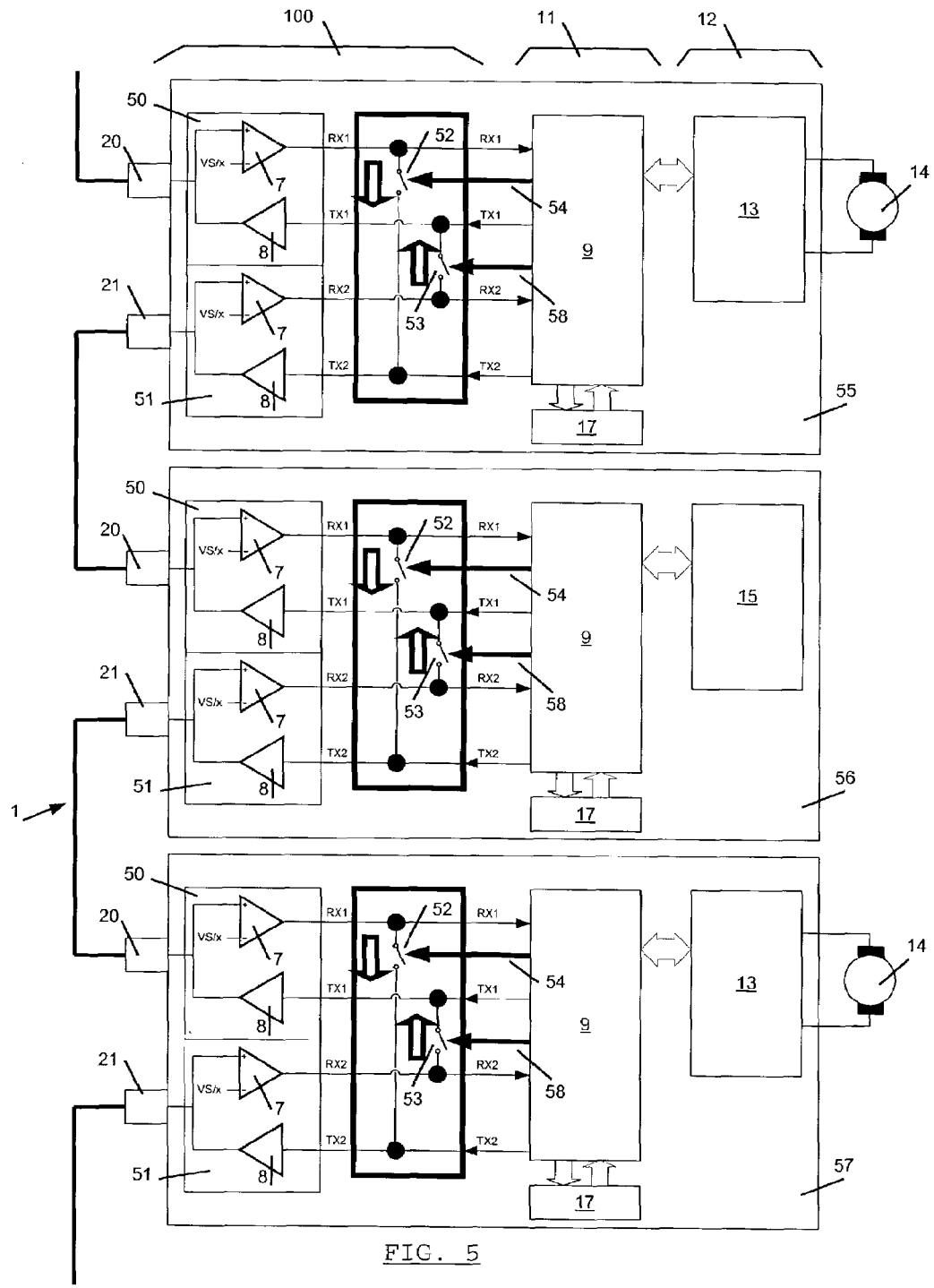
Figure 6A:
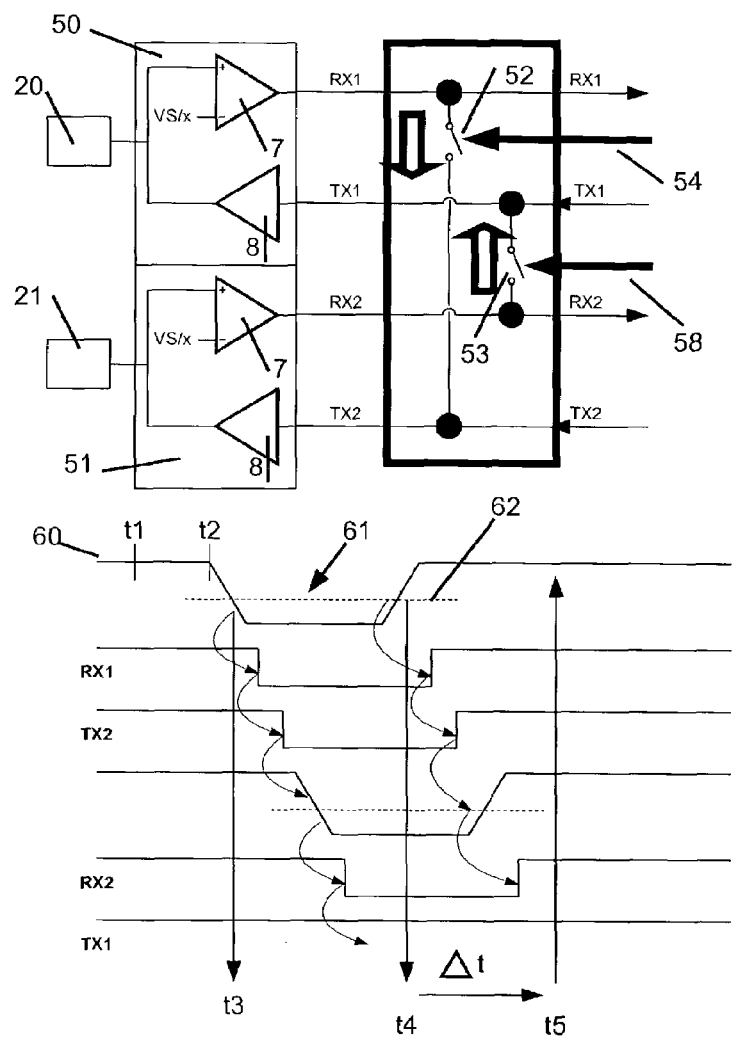
Figure 6B:
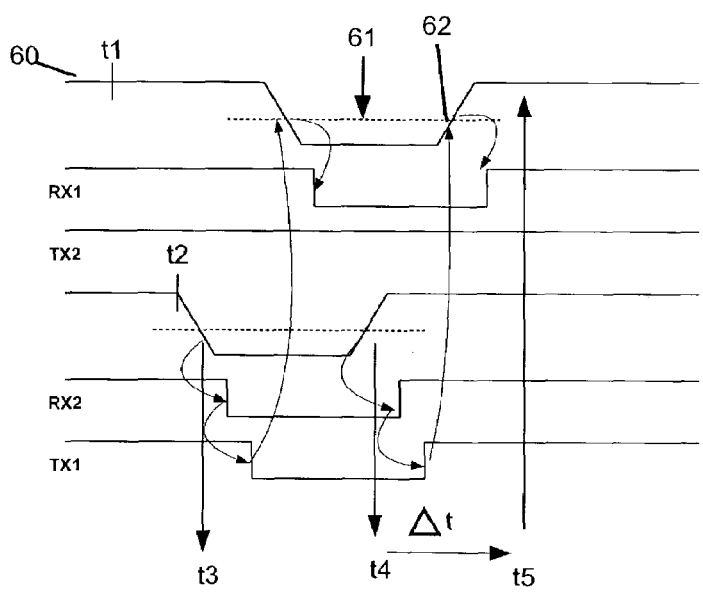
Figure 7:
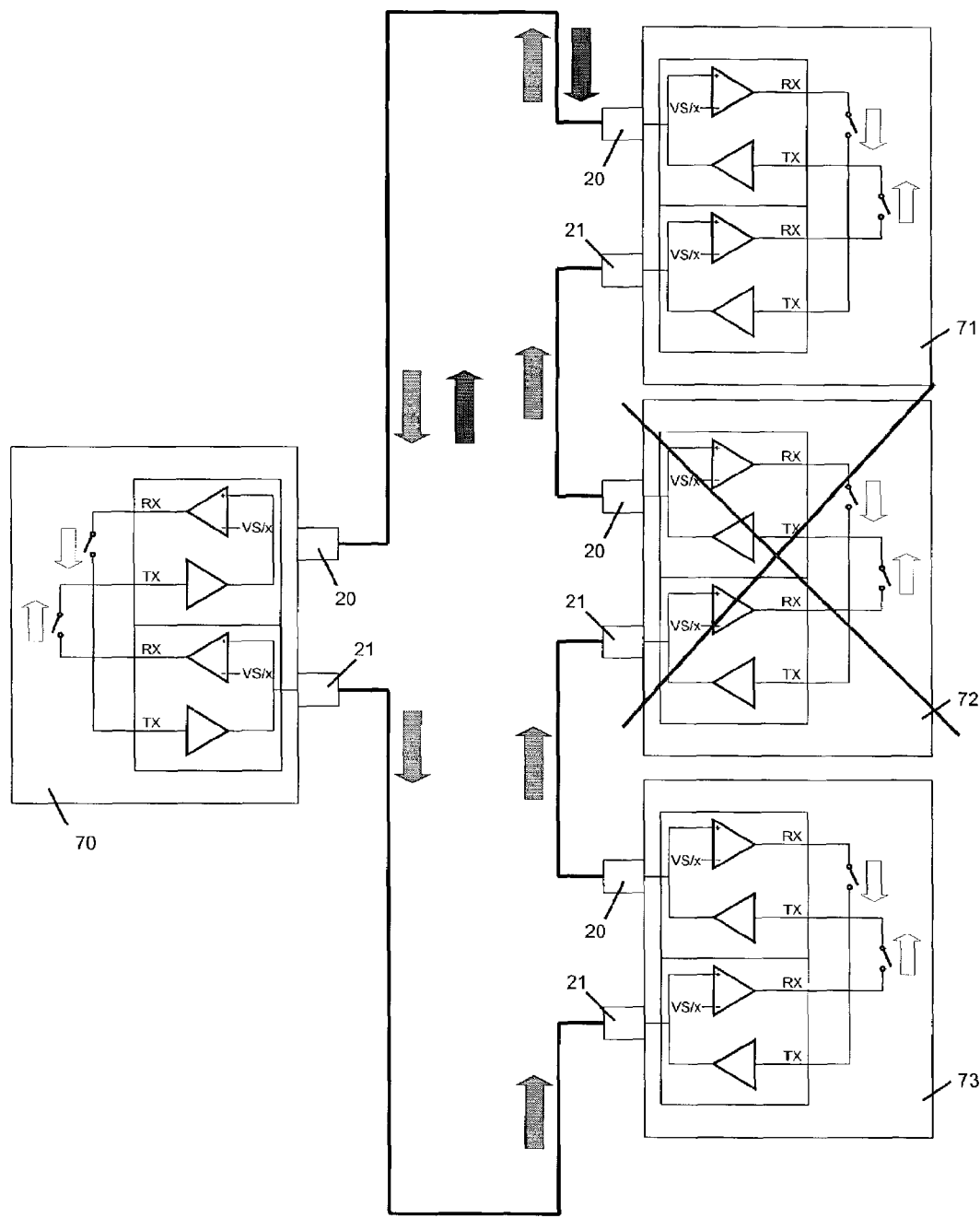

FIG. 1 represents a transmission system according to the prior art.
FIG. 2 represents a first embodiment of the invention.
FIGS. 3 and 4 represent two variants of a second embodiment of the invention.
FIG. 5 represents a third embodiment of the invention.
FIG. 6 is an illustration of the operation of the embodiment of FIG. 5.
FIG. 7 represents a closed loop bus system according to the invention.

DETAILED DESCRIPTION OF THE INVENTION

FIG. 1 shows a prior art design of a multiplex bus system, which might for instance be applied in a car. The bus 1 may consist of one or two wires, optical fibre or any other medium. Via connectors 2, the modules 3, 4, 5 are connected to the bus 1. In the exemplary case of FIG. 1, modules 3 and 5 are slave modules, whereas module 4 is a master module. With master we indicate the device that organises the communication on the bus, and with slaves we indicate all the other modules controlled by the master. If however the slave can also start the communication, then this node acts also as master from the bus-protocol point of view. As is known, a system of this kind may comprise a plurality of masters as well as slaves. For the invention, it is only important that one of the nodes controls the bus during start-up for address assignment. This task could even be shared with other modules but at a given moment in time only one node acts as master in the way defined above.

Independent of whether a module has the function of a master or a slave, each module comprises a so-called 'physical layer device' 10, which essentially consists of a transceiver 6 in every module. The transceiver comprises a comparator 7 for producing a well-conditioned 'receive' signal RX on the basis of an incoming digital signal, and a transmitter 8 (which might be a simple level-shifter) for producing a suitable outgoing signal on the basis of a 'transmit' signal TX. The 'data link layer device' 11 comprises the protocol handler 9, which is an electronic device, programmed to control incoming and outgoing digital traffic. The protocol handler receives the RX signal and produces the TX signal of the transceiver. An address setting device 16 is also included in the data link layer device 11. The address setting device is coupled to the protocol handler 9, and is adapted to store an address which can be manually set. This address may be communicated to the protocol handler 9. Finally, an 'application layer device' 12 is also present. In the figures, the application layer device of the slave nodes consists of one block 13 to drive a motor 14 but this block could consist of different subblocks to interface to any application one wants to control from another node; e.g. 12 could contain even a micro-controller to control any type of actuator, to measure parameters by means of sensors or to interface to an other bus in case of a gateway. In the case of the slave modules 3, 5 this device 12 is adapted to send the necessary command signals to the controlled component (in many cases an electric motor 14, for example for driving the movement of a window), on the basis of data received through the bus 1 via the transceivers 6 and the protocol handlers 9. In the case of the master module 4, the application layer device 12 essentially comprises a micro-controller or state-machine 15 or any other control unit. The actual embodiment of the application layer 12 is not relevant for this invention.

Messages, i.e. sequences of digital data may be put on the bus 1 by one of the connected modules. Every module on the bus is able to send as well as to receive data. In the configuration shown, data which is put on the bus, regardless by which module is received by every other module on the bus. Each message which is sent thereby comprises a number of fields, whose function may differ according to the protocol which is in place. In most cases, there is an identifier field which comprises information related to the address of modules to which the message is sent and information of the action to be taken. In most cases, there are also one or more data fields comprising information related to the action to be taken (for example: lights on, window down, window down to point X, etc . . . ). As mentioned before, the configuration of FIG. 1 suffers from the necessity to apply a manual address setting of the address setting device 16, prior to installation or replacement of a module.

FIG. 2 shows a bus system according to a first embodiment of the invention. The basic idea is to split up the bus 1 into a daisy-chain configuration. This is done by equipping each module with two connectors 20, 21, in stead of one as in the prior art configuration of FIG. 1. In stead of a continuous bus to which the modules are attached, the bus—or more correctly the data-transfer on the bus—now enters a module through one connector and leaves it through the other, in any one of both directions. The modules of the invention are further characterized by the presence of an interruption device 22. This device has the form of a switch or a set of switches, depending on the number of wires in the particular bus. The function of 22 is to create a physical separation of the two connectors 20, 21 and consequently an interruption of the bus 1—or more correctly the data-transfer on the bus. In the following, each interruption device 22 placed in the path of the data transfer will be simply called 'switch', even though it is pointed out that each such device may comprise a set of interrupters, one in every wire of the bus.

Furthermore, according to another aspect of the present invention, the modules in the system of the invention receive their addresses through the bus itself. The modules may start with a default address e.g. 0 which makes it clear for a module that it has yet to receive it's dedicated address from another module on the bus. The actual address setting is preferably done during an initializing procedure, before start-up of the system. The module which controls the initialization procedure is further called master-module. It is reminded here that more than one master node may be present on a bus. According to the invention, however, only one master is responsible for the address setting. In the following, any reference to 'the master' applies to this particular initializing master node.

The address setting operation is performed by starting from a condition wherein all the switches 22 are open, and in which the address is first set in one module closest to the master module in charge of the address setting operation. By closing the rest of the switches in a predefined order, the addresses of all the other modules on the bus may then be set consecutively. Such an operation may be performed after installation or replacement of a particular module, thereby obviating the need for setting the address manually on the module itself. When all the switches 22 are closed, the operation of the bus system is identical to the classic system of FIG. 1.

DETAILED DESCRIPTION OF PREFERRED EMBODIMENTS OF THE INVENTION

A first bus system according to the invention is shown in FIG. 2. This will first be described, together with the method of initializing such a bus system. This will be followed by the description of some other preferred embodiments.

In the embodiment of FIG. 2, the majority of modules comprise two transceivers 24 and 25, which receive respective digital signals RX1 and RX2 and which transmit respective digital signals TX1 and TX2. Each module of the type shown further includes one protocol handler 9, which is coupled to both transceivers and which respectively receives and transmits from and to them the above mentioned signals. The transceivers 24 and 25 are coupled to the two connectors 20 and 21 respectively. The messages, converted by the protocol handlers into signals TX1 and TX2, may be put on the bus through either one or both of the transceivers 24 and 25.

In contrast to the prior art physical layer device, the present physical layer device 100 further includes a switch 22 in every module shown, which is placed between the connectors 20 and 21, and such that opening of this switch 22 effectively interrupts the bus traffic passing through the module. Signals may however still be generated and sent on the bus by a module with an open switch 22. When the switch 22 is open, a message may be sent via TX1 on the first transceiver 24 or via TX2 on the second transceiver 25. The presence of the two transceivers 24 and 25 and the switch 22 therefore allows to control the direction in which data are sent. The protocol handler is programmed to be able to command the switch 22, through a command signal 23.

Another aspect of the present invention deals with the initialisation of such a bus system. The system of FIG. 2 is thereby capable of setting the addresses of all the nodes on the bus, regardless of the position of the master in charge of the address setting, with respect to the other nodes. This is possible due to the fact that the modules are equipped with two transceivers.

To further illustrate the address setting procedure, we assume that the modules 30 to 32 of FIG. 2 are respectively: slave 30, initializing master 31 and slave 32. It is also further assumed that both at the top 40 and at the bottom 41 of the figure, an upper chain 40 and a lower chain 41 of modules are connected. The system shown is an open bus system, i.e. the bus is not closed into a loop.

The initializing sequence starts from the condition wherein all the switches 22 are open, in every module on the bus, including the master 31. By using only the signal TX1 on the first transceiver 24, the master 31 may then set the address of the neighbouring slave module 30, through the bus partition 33. The protocol handler 9 of the slave 30 is adapted to receive this message, to extract the address therefrom and to save the address in the appropriate memory allocation in the receiving device 17, coupled to it. The device 16 used in the prior art may comprise a one time programmable memory. In the case of the invention, an embodiment of the memory in device 17 consists of a multitime programmable memory. After setting the address, the master can further initialise the node by sending other commands. This possible initialisation is ended by closing the switch 22 of the slave 30. This action could be performed by the slave itself or by another command coming from the master. Once the switch 22 of the slave 30 is closed, the master is coupled to the slave module next to module 30, in the upper chain 40. The module in the upper chain next to module 30 may in this way, through the closed switch 22 of module 30, receive its address setting and a subsequent command to close its own switch 22, after which the next module in the upper chain 40 can be reached. When the addresses of all the nodes in the upper chain have been set, the master may set the address of its second directly neighbouring node 32, by sending a message through TX2 of the master. All modules of the lower chain 41 may then be subsequently reached, and their addresses set in the way described above. When all the addresses have been set, the switch 22 of the master 31 is closed too, at which point all the switches 22 are closed, and normal operation of the system may commence. When all the switches 22 are effectively closed, only one transceiver of the pair 24, 25 in the nodes shown may remain active, since a single transceiver can provide communication on the bus in the way described for the prior art systems such as the one shown in FIG. 1.

It is to be noticed, that in this configuration, the nodes which are at the end of either the top or bottom chain do not need a switch, since they will come within reach of the master's command signals by the closing of the switch 22 in the module directly next to them. These 'outer modules' may therefore take on the form of the classic nodes of FIG. 1, in the sense that these modules have one connector, one transceiver and no switches but the control handler 9 of these outer modules has still to be able to initisalize the address on request of the master. This means that these outer modules need to comprise a receiving device 17, for instance comprising the above mentioned multitime programmable memory, accessed by the protocol handler 9. Likewise, when the initializing master 30 is placed at the end of an array of nodes, it doesn't need a switch, nor a double transceiver.

Generally, the method of initializing a bus system of the invention comprises the following steps:

- a transmission system of the invention is provided, wherein all the pairs of connectors 20, 21 of each module are separated (i.e. all switches 22 are open),
- the master module in charge of the address setting sets the address of a first module which is adjacent to said master module through the bus connection between said master and said slave,
- said first module connects its two connectors 20, 21 together (close switch 22), the master module sets the address of a second module, adjacent to said first module, said second module connects its two connectors 20, 21 together (i.e. close switch 22)

The last two steps are repeated until all the slave modules and possibly other master modules have received their address. Depending on the position of the initializing master, the series of steps must be performed in two directions, as explained in the case of the system of FIG. 2. The step wherein a module which has received its address closes the switch may be commanded by the master through the bus, or this command to close the switch may be generated by the module which has just received its address. This depends on the type of module in question.

The method may further comprise substeps such as a step of checking whether an address has been set previously on a particular node, or receiving a confirmation of the address setting from a particular node, etc. The steps outlined above form the basis of a detailed initialization procedure which may be adapted to the type of bus system, the type of nodes present and other factors, as will be appreciated by a person skilled in the art.

In the system of the invention, all the nodes, slaves and submasters may be installed without prior address setting. This allows a more efficient stock management of identical modules, and a reduction of time loss or error sensitivity of the installation and replacement of individual modules. The initializing master is a unique module which may have a predefined address, or a default address. The initializing procedure can easily be designed in such a way that the initializing master cannot ascribe its own address to one of the other modules on the bus. Therefore, the initializing master does not need a manual address set.

FIG. 3 shows a second embodiment of the present invention, wherein the modules have only one transceiver. However, in this case the address setting can only be done in one direction. For the system of FIG. 3, this is the direction from top to bottom. This means that the initializing master 26 must be placed at the top of the chain, and that switches 22 are to be present between the two connectors 20, 21 in each of the nodes 27 in the chain, except in the last one. This means that the system of FIG. 3 is less flexible with respect to the location of the initializing master node.

This is true also for the system of FIG. 4, wherein nodes 27 like the ones of FIG. 3 are placed on both sides of a master 28, which has one transceiver 6. The placement of the switch 22 in the nodes is such that the address can be received by a particular node, when the switch of that same node is open. In the configuration of FIG. 4, the master 28 cannot be placed at another location of the bus. The master has also first to set the addresses of the nodes connected to connector 20 before he starts with the nodes connected to connector 21. In the configuration of FIG. 4, the master 28 also has to close its own switch 22 after having set the addresses of the upper chain, such as to be able to access the modules of the lower chain.

FIG. 5 shows another embodiment of the present invention, wherein the separation of the two connectors 20, 21 is done at the outputs of the transceiver's comparators 7. According to this embodiment, the majority of modules connected to the bus comprise two transceivers 50 and 51. Transceiver 50 is coupled to the first bus connector 20, and transceiver 51 is coupled to the second bus connector 21. A first switch 52 is placed between the output RX1 of the first transceiver's comparator and the input TX2 of the second transceiver's transmitter. The second switch 53 is placed between the output RX2 of the second transceiver's comparator and the input TX1 of the first transceiver's transmitter. The switches 52 and 53 are once again defined as interruption devices, comprising one or more interrupters, according to the number of wires in the bus in which the switches are incorporated. Both switches 52 and 53 are operated by separate command signals 54 and 58 generated by the protocol handler. The address setting takes place according to the method described above: initially, all the switches 52, 53 are open, allowing the master module 56 to set the address of one neighbouring module, for example the slave module 55. The switches 52 and 53 act as a repeater in such a way that they pass the command arriving at terminal 21 to terminal 20 and the command arriving at terminal 20 to terminal 21. Activating the repeater is equal to allowing data to pass through the node from either of both directions. When activated, the repeater's switches open and close alternatively, depending on the incoming signals, which is explained in more detail in the next paragraph. After node 55 has received its address setting, the repeater of slave 55, consisting of switches 52 and 53, is activated, allowing an address set of the next module in the upper chain, and so on. The address setting of the lower chain (node 57 and neighbours) is done by consecutive steps of address set and activating the repeaters, consisting of switches 52 and 53, in the subsequent nodes, until all addresses have been set. Once again, the modules at the end of the chains may be classical nodes, in the sense that these modules have one connector, one transceiver and no switches but the control handler has still to be able to initisalize the address on request of the master.

The operation and the configuration of two switches 52 and 53 has the function of a repeater, which controls the direction of the flow of data. Data sent by a node (master or slave) is sent in both directions on the bus, through connections TX1 and TX2. Data received however, be it on connector 20 or connector 21, must be transmitted in one direction only to the other connector. In the bus design shown in FIG. 5, care must be taken that a signal, for example a signal received on connector 20 is sent through to connector 21, via the closed switch 52, and does not come back onto connector 20, via the closed switch 53. Switches 52 and 53 will therefore during operation open and close alternatively, according to the direction of the data received. FIGS. 6*a* and 6*b* illustrate this mechanism for a data flow from 20 to 21 and from 21 to 20 respectively. At the instant t1 (FIG. 6*a*), a 'high' voltage level 60 is present on the connector 20 and on the connector 21. At t1, both the switches 52 and 53 are closed. At the instant t2, a 'low' pulse 61 is received on connector 20, which may for example correspond to the start of a message being sent. The low pulse 61 is to be transmitted through RX1 and TX2, to the second connector 21, and is also sent back via RX2, to the protocol handler 9. It must however be avoided that the pulse 61 is sent back via TX1 to the first connector 20, which would influence the signal being received on that connector. For this reason, the switch 53 is opened at moment t3, when the signal on 20 reaches a reference level 62. When the same reference level 62 is reached again on the rising slope of the pulse 61 (at t4), a delay time Δt is started after which the switch 53 is closed, at t5. In this way, it is made sure that the low pulse 61 is not transmitted on TX1, as is apparent from FIG. 6*a*. The procedure for a message sent in the opposite direction is illustrated in FIG. 6*b*. In case of an error on one of the connectors 20 or 21, the corresponding switch may be opened for a longer period of time. The implementation of the repeater distinguishes between the voltage level 60 and the voltage level during pulse 61. The voltage level 60 corresponds with the inactive-mode, when no message is sent, while the level during pulse 61 corresponds with active-mode, also called dominant mode. As could be observed, a dominant mode fixes the repeater for communication in one direction and blocks the communication in the other direction. As such a permanent dominant state at one part of the daisy-chain blocks all repeaters. For this reason a permanent dominant state has to be detected and to be isolated from the bus by opening the repeaters connected directly to this faulty part of the daisy-chain.

The nodes shown in FIGS. 5 and 6 may advantageously be used in a closed loop structure, as illustrated in FIG. 7. The master node 70 thereby allows the direction of the data to be controlled since every node 71 to 73 can be reached from either one of its two bus connections 20, 21. In this way, when one node is malfunctioning, e.g. node 72, all other nodes in the loop can still be reached by the master. Other advantages of this topology are:

- the master can compare the sent data with the received data, leading to an extra fault confinement.
- When in-frame response is allowed, the master can ask the status of every node with one command. Every node adds his status information within the same frame, leading to a reduction in bus traffic.
- A faulty node can be isolated and removed from the bus, leading to an improved fault-tolerance.
- A bus error like a short or open will not block the bus.
- A permanent dominant state at one node of the bus can be isolated from the bus.

The nodes of the embodiments depicted in FIG. 2, FIG. 3, FIG. 4, FIG. 5 and FIG. 7 can also be combined on one bus with nodes of FIG. 1, i.e. having only one connector 2. These last nodes still need a manually set address while the nodes in the different embodiments still receive their address during the initialisation procedure. When used in a closed loop such as in FIG. 7, the use of the prior art modules of FIG. 1 has the drawback that not all faulty nodes can be isolated, but at least all segments of the bus can be isolated.

Likewise, different nodes according to the invention may be put on the same bus. For example, nodes having two transceivers 50 and 51 and two switches 52 and 53 may be put on the same bus as nodes having one transceiver 6 and one switch 22 and/or with nodes having two transceivers 24 and 25 and one switch 22. As explained above, some configurations will offer less flexibility in the position of the address setting node, depending on the types of nodes used. It can be considered, however, that any system having at least one module with two connectors 20 and 21 and a means for interrupting the bus between said two connectors (one switch 22 or two switches 52 and 53) is a system according to the present invention.

The invention is also related to the individual modules themselves, as they are described and depicted in the drawings, and to the use of these modules as master or slave.

The invention claimed is:

1. A transmission system for transmitting digital data in a time domain multiplexing mode, comprising a digital data bus, and a plurality of modules coupled to said data bus, wherein at least one of said modules of said plurality comprises two connectors, directly connected together so that data passing through said bus enters said module through one connector and leaves said module through the other connector whereby said module is able to send data to the bus and to receive data from the bus, and wherein said at least one module further comprises a first interruption device, placed in the path between said two connectors, for disconnecting the two connectors from each other so that the data transfer via said bus is interrupted.

2. The transmission system according to claim 1, wherein said at least one module further comprises a first transceiver, said first transceiver comprising a comparator and a transmitter.

3. The transmission system according to claim 2, wherein said at least one module further comprises a second transceiver, said second transceiver comprising a comparator and a transmitter, and wherein the input of said comparator and the output of said transmitter of said first transceiver are coupled to one of said two connectors, while the input of said comparator of said second transceiver and the output of said transmitter of said second transceiver are coupled to the other of said two connectors.

4. The transmission system according to claim 3, wherein said at least one module further comprises a second interruption device, whereby said first interruption device is placed in the path between the output of the comparator of said first transceiver, and the input of the transmitter of said second transceiver, and whereby said second interruption device is placed in the path between the output of the comparator of said second transceiver and the input of the transmitter of said first transceiver.

5. A transmission system according to claim 4, wherein said at least one module further comprises a protocol handler and a receiving device receiving a signal sent on said bus, analyzing said signal and deducing therefrom an address of said at least one module, for subsequent storage into a storage device included in said receiving device, said protocol handler further producing command signals for opening or closing said first interruption device and/or said second interruption device.

6. A transmission system according to claim 1, wherein said system is an open system, meaning that all modules which are coupled to said bus form a chain of modules which is not closed into a loop.

7. A transmission system according to claim 1, wherein said system forms a closed loop system.

8. A transmission system according to claim 7, wherein every module on said closed loop system comprises two interruption devices and two transceivers.

9. A method for initializing a transmission system according to claim 1, said plurality of modules including at least one master module in charge of address setting of said transmission system, and at least one slave module, said method comprising the steps of:

- providing said transmission system, wherein the connectors of each module of said plurality which is having two connectors, are disconnected from each other within each of said modules which is having two connectors
- ordering said master module in charge of the address setting, to set the address of a first slave module which is adjacent to said master module, through a signal sent on the bus connection between said master and said first slave module,
- ordering said first slave module to connect its two connectors together,
- ordering the master module to set the address of a second slave module, adjacent to said first slave module, through a signal sent on the bus connection between said master and said second slave module,
- ordering said second slave module to connect its two connectors together, repeating the steps of setting the address and connecting the connectors, until all slave modules on the system have received their address.

10. A module coupled to a digital data bus whereon digital data is transported in a time domain multiplexing mode, said module comprising two connectors, directly connected together so that data passing through said bus enters said module through one connector and leaves said module through the other whereby said module is able to send data to the bus and to receive data from the bus, said module further comprising a first interruption device, placed in the path between said two connectors wherein the opening of said first interruption device disconnects the two connectors from each other so that the data transfer on said data bus is interrupted.

11. The module according to claim 10, further comprising a first transceiver, said first transceiver comprising a comparator, and a transmitter.

12. The module according to claim 11, further comprising a second transceiver, said second transceiver comprising a comparator and a transmitter, and whereby the input of said comparator and the output of said transmitter of said first transceiver are coupled to one of said two connectors, while the input of said comparator and the output of said transmitter of the second transceiver are coupled to the other of said two connectors.

13. The module according to claim 12, further comprising a second interruption device, said first interruption device being placed in the path between the output of said comparator of said first transceiver, and the input of said transmitter of said second transceiver, said second interruption device being placed in the path between the output of the comparator of said second transceiver and the input of said transmitter of said first transceiver.

14. The module according to claim 10, further comprising a protocol handler and a receiving device receiving a signal sent on said bus, analyzing said signal and extracting therefrom an address of said module for subsequent storage into a storage device included in said receiving device, said protocol handler further producing command signals for opening or closing said first interruption device and/or said second interruption device.

15. The module according to claim 10, wherein the module is used as a master module in a transmission system for transmitting digital data in a time domain multiplexing mode.

16. The module according to claim 10, wherein the module is used as a slave module in a transmission system for transmitting digital data in a time domain multiplexing mode.

* * * * *